March 1, 1966 D. O. SCHULTZ 3,238,385

EXCLUSIVE "OR" TUNNEL DIODE LOGIC CIRCUIT

Filed Sept. 3, 1963

INVENTOR
DONALD O. SCHULTZ

United States Patent Office 3,238,385

Patented Mar. 1, 1966

3,238,385

EXCLUSIVE "OR" TUNNEL DIODE LOGIC CIRCUIT

Donald O. Schultz, North Springfield, Va., assignor to the United States of America as represented by the Secretary of the Navy Filed Sept. 3, 1963, Ser. No. 306,396
4 Claims. (Cl. 307—88.5)
(Granted under Title 35, U.S. Code (1952), sec. 266)

Figure 1:
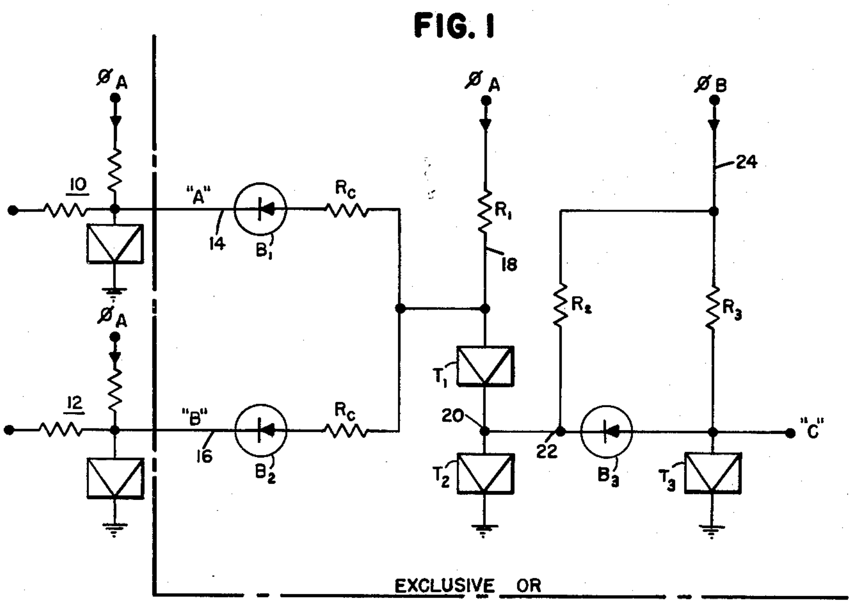

The invention described herein may be manufactured and used by or for the Government of the United States of America for governmental purposes without the payment of any royalties thereon or therefor.

The present invention relates generally to exclusive "OR" circuits and more particularly to an exclusive "OR" circuit employing tunnel diode logic.

In the past most computer logic circuits employed transistors or vacuum tubes as their active elements. With the discovery of the tunnel diode a new approach to computer logic has developed utilizing this extremely high speed, stable, active circuit component with its advantageous attribute of less energy dissipation and its requirement for much less operating power than its transistor and vacuum tube counterparts.

Some difficulty has been experienced in providing for a reliable exclusive "OR" function, a function which is basic to computer logic, in computers employing tunnel diode logic. One problem in this area is that of input loading caused by the switching of a tunnel diode to its high voltage state. Another problem, particularly where series connected tunnel diodes are employed, is the determination of the actual sequence of diode switching which may provide an indication of the exact point of breakdown when repairs are required.

The exclusive "OR" circuit of the present invention provides a high speed, stable, logic circuit employing selectively switched tunnel diodes as the active elements in the performance of the exclusive OR function. This circuit further eliminates the problem of input loading when a tunnel diode switches to its high voltage state by the novel inclusion of backward or back diodes in the input circuits.

The exclusive "OR" circuit of the present invention basically comprises first and second series connected tunnel diodes with a pair of parallel signal inputs connected to said first tunnel diode along with a first clock phase input, an output circuit is connected between the first and second tunnel diodes and a second clock phase input is connected to the output circuit.

An object of the present invention is the provision of an exclusive "OR" circuit employing tunnel diode logic.

Another object of this invention is to provide an exclusive "OR" circuit employing tunnel diodes which circuit may be readily modified to perform the functions of a half adder or an inverter.

Yet another object of the present invention is the provision of a tunnel diode logic circuit which eliminates the adverse effects of input loading.

A still further object of this invention is to provide an exclusive "OR" circuit employing tunnel diode logic in which the switching of each tunnel diode to its high voltage state can be specifically anticipated.

Figure 2:
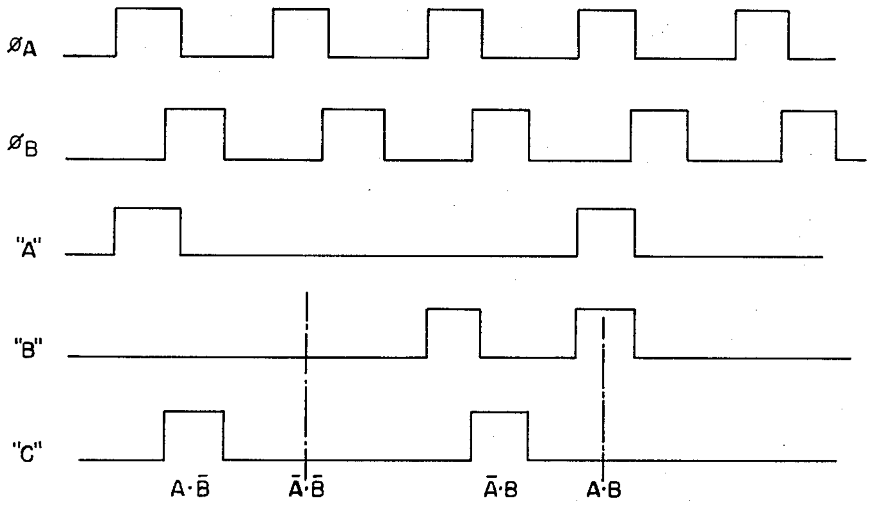

These and other objects of the present invention along with many of the attendant advantages thereof will be readily appreciated as the same becomes better understood as the following detailed description is considered in conjunction with the accompanying drawings in which:

FIG. 1 is a schematic diagram of a typical exclusive "OR" circuit in accordance with the present invention; and FIG. 2 illustrates timing, input and output waveforms typical of the operation of the invention shown in FIG. 1.

Referring now in detail to the drawing there is shown in FIG. 1 a pair of conventional tunnel diode threshold AND gates at 10 and 12 which provide for transmission of input signals A and B, when present, to their respective input lines 14 and 16 only during the presence of clock pulse $\phi A$ transmitted by a two phase clock (not shown) which transmits clock pulses $\phi A$ and $\phi B$ in the time relationship shown in FIG. 2.

It will be apparent to one skilled in the art that the exclusive OR circuit of the present invention would be equally compatible in a digital computer employing three-phase tunnel diode logic even though only two clock phases would be required for the performance of the exclusive OR function.

Parallel input lines 14 and 16, respectively include backward or back diodes $B_1$ and $B_2$, the function of which will be later described, and are connected in parallel with line 18 carrying signal $\phi A$ from the clock to the anode of tunnel diode $T_1$. The cathode of tunnel diode $T_1$ is serially connected to the anode of tunnel diode $T_2$ through junction 20. The cathode of $T_2$ is directly connected to circuit ground.

Output line 22 containing back diode $B_3$ and tunnel diode $T_3$ is connected at junction 20 and also serves as a small leakage or parallel path from junction 20 the function of which will be later described in detail. A line 24 carrying clock pulse $\phi B$ from the clock is connected through a pair of parallel resistances $R_2$ and $R_3$ directly to output line 22. The inclusion of resistances $R_c$, $R_1$, $R_2$ and $R_3$ throughout the circuit is of course to provide proper adjustment of voltage levels for optimal operation of the circuit.

In operation the presence or absence of an output at C from the exclusive OR circuit of the present invention is controlled entirely by the switching of either tunnel diode $T_1$ or tunnel diode $T_2$ to its high voltage state. If no signal is present in either of input lines 14 or 16 the current provided by the coexistence of pulses $\phi A$ and $\phi B$ is insufficient to switch either of the tunnel diodes $T_1$ or $T_2$ to its high voltage state. When input signals A and B are both present in their respective input lines 14 and 16 the current supplied by the combination of input signals A and B and clock pulse $\phi A$ will be sufficient to cause $T_1$ to switch to its high voltage state. When $T_1$ switches to its high voltage condition, a decreased current flows through the network $R_1$-$T_1$-$T_2$. This decrease in current is such that $T_2$ does not switch when $\phi B$ occurs. In addition, $T_2$ will not switch to its high voltage state because of the leakage or current drain provided by back diode $B_3$ connected between tunnel diodes $T_1$ and $T_2$ at junction 20. This current drain is sufficient to prevent tunnel diode $T_2$ from switching into its high voltage state when tunnel diode $T_1$ switches into its high voltage state. With $T_1$ in its high voltage state back diodes $B_1$ and $B_2$ are back-biased and the current flowing through $T_1$ and $T_2$ is not sufficient to cause $T_2$ to switch to its high voltage state when clock pulse $\phi B$ comes on.

The exclusive OR circuit of the present invention will provide an output at C only when an input signal is present in but one of the input circuits 14 and 16. An input signal A unaccompanied by an input signal B when combined with clock pulse $\phi A$ will provide insufficient current to cause tunnel diodes $T_1$ or $T_2$ to switch to their high voltage state. However, with the rise of clock pulse $\phi B$ in line 24 the combination of current provided by input signal A, clock pulse $\phi A$ and clock pulse $\phi B$ at junction 20 will be sufficient to cause only tunnel diode $T_2$ to switch to its high voltage state and provide sufficient current through back diode $B_3$ to cause tunnel diode $T_3$ to also switch to its high voltage state thus providing a buffered output at C. It is seen therefore that with a single input A, the current from input A and the current due to $\phi A$ passes through $T_1$ and $T_2$ but is insufficient to switch either of them, but with the addition of the current of $\phi B$, $T_2$ switches.

Although the tunnel and back diodes of the present invention may be of germanium, silicon or gallium arsenide construction it is essential that all of the tunnel and back diodes employed in the circuit at the same time be composed of the same material.

The exclusive OR circuit of the present invention has successfully operated with the following combination of element values and components:

| | |
|---|---|
| Tunnel diodes $T_1$, $T_2$ and $T_3$ | General Electric TD2A. |
| Back diodes $B_1$, $B_2$ and $B_3$ | General Electric BD5. |
| Resistors $R_1$ and $R_2$ | 8,200 ohms. |
| Resistor $R_3$ | 4,700 ohms. |
| Resistors $R_c$ | 360 ohms. |
| Resistors in AND gates **10** and **12** | 4,700 ohms. |

It should be noted that the back diodes $B_1$, $B_2$ and $B_3$ have been shown in FIG. 1 to be inserted in their respective circuits in the opposite direction from their actual mode of operation in order that they may be distinguished from the tunnel diodes in the circuits. In actual practice for example the anode of back diode $B_1$ would be connected to the output of AND gate 10.

It will be apparent to one skilled in the art that simple modifications of the basic exclusive OR circuit of the present invention will permit the circuit to function as a half adder or an inverter. The circuit becomes an inverter by simply applying an input signal to a selected one of the input lines 14 or 16 at every input time. A half adder circuit can be easily arrived at by the connection of a simple tunnel diode analog threshold AND gate across the input lines 14 and 16 to provide the "carry" function while the output at C represents the "sum" function.

It will be apparent from the foregoing that the circuit of this invention will perform the exclusive OR function in a computer employing either two or three phase tunnel diode logic. It will further eliminate the adverse effect of back or input loading when the tunnel diodes switch to their high voltage state and is readily adapted to perform the computer functions required of a half adder or inverter.

Although a specific circuit has been shown and described and specific identities and values for circuit elements have been suggested, it is to be understood that the scope of this invention is to be limited only by the appended claims and not otherwise.

What is claimed is:

1. An exclusive OR logic circuit comprising:

first and second serially connected tunnel diodes having a common connection, a first input circuit having a first means for transmitting a first input signal, a second input circuit having a second means for transmitting a second input signal, said second input circuit having a common connection with said first input circuit and said common connection being coupled to said first tunnel diode, and circuit means coupled to said first and second serially connected tunnel diodes for enabling only said second tunnel diode to be switched to its high voltage state when only a single input signal is applied to one of said first or second input circuits and for enabling only said first tunnel diode to be switched to its high voltage state when first and second input signals are applied to said first and second input circuits, respectively.

2. An exclusive OR logic circuit as set forth in claim 1 wherein said circuit means includes:

means for receiving a first clock pulse coupled to the common connection of said first and second input circuits, an output circuit coupled to the common connection of said first and second tunnel diodes, and means for receiving a second clock pulse coupled to said output circuit.

3. An exclusive OR logic circuit as set forth in claim 2 wherein said output circuit comprises:

a back diode coupled to the common connection of said first and second tunnel diodes, and a third tunnel diode connected to said back diode, whereby the output of said exclusive OR logic circuit is taken at the junction of said back diode and said third tunnel diode.

4. An exclusive OR logic circuit as set forth in claim 3 further including a back diode in each of said first and second input circuits.

References Cited by the Examiner

UNITED STATES PATENTS

| | | | |
|---|---|---|---|
| 3,164,730 | 1/1965 | Urban | 307—88.5 |
| 3,165,643 | 1/1965 | Wehr | 307—88.5 |
| 3,166,682 | 1/1965 | Parham | 307—88.5 |
| 3,168,652 | 2/1965 | Kaufman | 307—88.5 |

FOREIGN PATENTS

| | | |
|---|---|---|
| 1,296,221 | 5/1962 | France. |
| 907,656 | 10/1962 | Great Britain. |

OTHER REFERENCES

Murphy and Turnbull, "Transistor Tunnel Diode Bistable Trigger," IBM Technical Disclosure Bulletin, vol. 4, No. 12, May 1962, pages 78 and 79.

ARTHUR GAUSS, *Primary Examiner.*

R. H. EPSTEIN, *Assistant Examiner.*